United States Patent
Matsukado et al.

(10) Patent No.: US 9,327,365 B2
(45) Date of Patent: May 3, 2016

(54) ALUMINUM ALLOY BRAZNG SHEET FOR HEAT EXCHANGERS AND ALUMINUM ALLOY BRAZED ARTICLE FOR HEAT EXCHANGERS

(75) Inventors: Katsuhiro Matsukado, Moka (JP); Akihiro Tsuruno, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 326 days.

(21) Appl. No.: 13/318,425

(22) PCT Filed: May 27, 2010

(86) PCT No.: PCT/JP2010/058992
§ 371 (c)(1),
(2), (4) Date: Nov. 1, 2011

(87) PCT Pub. No.: WO2010/137649
PCT Pub. Date: Dec. 2, 2010

(65) Prior Publication Data
US 2012/0045660 A1 Feb. 23, 2012

(30) Foreign Application Priority Data
May 27, 2009 (JP) .................................. 2009-127626

(51) Int. Cl.
*B23K 35/22* (2006.01)
*B23K 35/28* (2006.01)
*B23K 35/02* (2006.01)
(Continued)

(52) U.S. Cl.
CPC ........... *B23K 35/288* (2013.01); *B23K 35/0233* (2013.01); *B23K 35/22* (2013.01); *C22C 21/00* (2013.01); *C22C 21/02* (2013.01); *F28F 19/06* (2013.01); *F28F 21/089* (2013.01); *B23K 2201/14* (2013.01); *Y10T 428/12764* (2015.01)

(58) Field of Classification Search
None
See application file for complete search history.

(56) References Cited

U.S. PATENT DOCUMENTS

| 5,837,388 A | 11/1998 | Doko et al. |
| 2002/0142185 A1 | 10/2002 | Kilmer |

(Continued)

FOREIGN PATENT DOCUMENTS

| CN | 101468535 A | 7/2009 |
| EP | 0 867 682 A2 | 9/1998 |

(Continued)

OTHER PUBLICATIONS

Combined Chinese Office Action and Search Report issued Jan. 24, 2013, in Chinese Patent Application No. 201080018013.1 with English translation and English translation of category of cited documents.

(Continued)

*Primary Examiner* — Adam Krupicka
(74) *Attorney, Agent, or Firm* — Oblon, McClelland, Maier & Neustadt, L.L.P.

(57) ABSTRACT

Disclosed is an aluminum alloy brazing sheet (1) for heat exchangers, the brazing sheet provided with a core material (2) and a filler material (3) that comprises an Al—Si—Zn alloy and is formed on at least one side of the core material (2). The core material (2) has a pitting potential of −650 mV or more (vs. Ag/AgCl). The filler material (3) has a zinc concentration of from 1 to 10 percent by mass; a liquid fraction X, at the brazing temperature, satisfying the relation $0.3 \leq X \leq 0.88$; and a clad ratio d (%) satisfying the relation $15 < d \leq 30$. The filler material has a product ($X \times d$) of the liquid fraction X and the clad ratio d (%) satisfying the relation $6 \leq X \times d \leq 23$.

14 Claims, 2 Drawing Sheets

(51) Int. Cl.
*C22C 21/00* (2006.01)
*C22C 21/02* (2006.01)
*F28F 19/06* (2006.01)
*F28F 21/08* (2006.01)

(56) References Cited

U.S. PATENT DOCUMENTS

| | | | |
|---|---|---|---|
| 2004/0238605 A1* | 12/2004 | Nishimura et al. | 228/264 |
| 2009/0162686 A1 | 6/2009 | Matsukado et al. | |
| 2012/0045660 A1 | 2/2012 | Matsukado et al. | |

FOREIGN PATENT DOCUMENTS

| | | |
|---|---|---|
| EP | 2 075 083 A1 | 7/2009 |
| JP | 57 94544 | 6/1982 |
| JP | 62 218795 | 9/1987 |
| JP | 62-218795 A | 9/1987 |
| JP | 07 041895 | 2/1995 |
| JP | 7-41895 A | 2/1995 |
| JP | 07 331372 | 12/1995 |
| JP | 08 120381 | 5/1996 |
| JP | 8-120381 A | 5/1996 |
| JP | 08 132284 | 5/1996 |
| JP | 8-132284 A | 5/1996 |
| JP | 08 260086 | 10/1996 |
| JP | 8-260086 A | 10/1996 |
| JP | 10 17968 | 1/1998 |
| JP | 10 34378 | 2/1998 |
| JP | 11 140572 | 5/1999 |
| JP | 11-140572 A | 5/1999 |
| JP | 11 343531 | 12/1999 |
| JP | 2001 162394 | 6/2001 |
| JP | 2001-162394 A | 6/2001 |
| JP | 2003 138355 | 5/2003 |
| JP | 2003-138355 A | 5/2003 |
| JP | 2003 138356 | 5/2003 |
| JP | 2003-138356 A | 5/2003 |
| JP | 2006 312768 | 11/2006 |
| JP | 2006 348358 | 12/2006 |
| JP | 2007 131872 | 5/2007 |
| JP | 2007-131872 A | 5/2007 |
| JP | 4477668 | 6/2010 |
| JP | 5704835 | 3/2015 |
| WO | WO 2004/052587 A1 | 6/2004 |

OTHER PUBLICATIONS

Mai, Xiao-bo, et al., Influence of Brazing Temperature and Cladding Ratio of Filler Metals on Melting Erosion of Aluminum Alloy, Dec. 30, 2005, pp. 13-15 (with English Abstract).
International Search Report Issued Aug. 31, 2010 in PCT/JP10/058992 Filed May 27, 2010.
Extended European Search Report issued Jun. 15, 2015 in Patent Application No. 10780603.6.

* cited by examiner (a)

(b)

ALUMINUM ALLOY BRAZNG SHEET FOR HEAT EXCHANGERS AND ALUMINUM ALLOY BRAZED ARTICLE FOR HEAT EXCHANGERS

TECHNICAL FIELD

The present invention relates to an aluminum alloy brazing sheet and an aluminum alloy brazed article each for heat exchangers.

BACKGROUND ART

Heat exchangers to be mounted in automobiles are formed by assembling components shaped from brazing sheets and brazing the assembled components, which brazing sheets each include an aluminum alloy core material clad with a filler material. Gauge down of such aluminum alloy brazing sheets for heat exchangers, typically for tube members, have been proceeded from a customary thickness of 0.3-0.5 mm to 0.2 mm or less for the purpose of weight reduction of the heat exchangers. Along with this, the aluminum alloy brazing sheets should have higher strength and better corrosion resistance. The weight reduction of a heat exchanger may be possible by employing a tube member composed of the aluminum alloy brazing sheet having a filler material facing outward, in combination with a fin member (bare fin) containing no filler material. This heat exchanger, however, is difficult to exhibit sufficient corrosion resistance when the filler-clad surface of the tube member, which is clad with the filler material to be joined with the fin member, is exposed to a corrosive environment.

To solve the problem, Patent Literature (PTL) 1 discloses an aluminum alloy brazing sheet which includes a core material and, present thereon, a filler material, which core material is composed of an Al—Mn alloy, and which filler material is composed of an Al—Si alloy containing Si in a content of 7.0 to 11.0 percent by mass and further containing Zn in a content of 1.0 to 7.0 percent by mass. The aluminum alloy brazing sheet is intended to improve its corrosion resistance by allowing part of Zn in the filler material to migrate into the surface layer of the core material during a brazing process and thereby allowing the surface of the component after brazing to have a less novel potential to impart a sacrificial effect to the component.

PTL 1: Japanese Unexamined Patent Application Publication (JP-A) No. H07-331372 (claims 1 and 2, paragraphs 0005, 0009, and 0010)

DISCLOSURE OF INVENTION

Technical Problem

According to the technique disclosed in PTL 1, however, Zn migrates little from the filler material into the core material during the brazing process, most of the filler material melts and fluidizes during the brazing process, and, after brazing, only little amount of the filler material remains on the surface of the member (core material) and only little amount of Zn is contained therein. Independently, this technique recommends to add less than 0.5 percent by mass of Cu to the core material, so as to allow the core material to have a more noble potential. However, the brazing process causes elements to migrate also from the core material into the filler material, and this causes a brazing filler layer (braze layer) containing a large amount of Cu to remain on the surface of the core material. This makes it difficult to allow the surface layer of the aluminum alloy brazing sheet after the brazing process, i.e., the surface layer of the core material, to have a sufficient potential difference with respect to the inside thereof in a thickness direction to thereby impart a sacrificial effect thereto. The surface layer, if exposed to a severe corrosive environment, may suffer from generation of through holes in early stages. In addition, most of Zn is contained in the filler material, which has fluidized during the brazing process, and a fillet formed by the fluidized filler contains Zn in a concentration higher than that of the surface of the aluminum alloy brazing sheet after brazing and is thereby susceptible to preferential corrosion. This may cause delamination at a brazed joint of the heat exchanger and may thereby cause falling of fins or spill of a coolant due to due to perforation corrosion of tubes.

Accordingly, an object of the present invention is to provide an aluminum alloy brazing sheet for heat exchangers which has satisfactory brazability and gives, after brazing, a filler-clad surface and a fillet each being satisfactorily resistant to corrosion.

Solution to Problem

To achieve the object, the present inventors have invented an aluminum alloy brazing sheet for heat exchangers which exhibits a satisfactory sacrificial effect, i.e., good corrosion resistance. This is achieved by controlling the contents of Zn and other elements contained in the filler material, controlling the liquid fraction of the filler material at a brazing temperature, and controlling the clad ratio (or thickness) of the filler material, thereby allowing only part of the filler material in the brazing process to allow the residue of the filler material to remain on the core material, and allowing the residual layer (residual filler layer) to function as a sacrificial layer. The present inventors have also invented an aluminum alloy brazing sheet for heat exchangers which gives a fillet being resistant to preferential corrosion, having good corrosion resistance satisfactorily maintained, and having a sufficient size to give a higher joint strength.

Specifically, the present invention provides an aluminum alloy brazing sheet for heat exchanges, which includes a core material; and a filler material being present on at least one side of the core material and including an Al—Si—Zn alloy, in which the core material has a pitting potential of −650 mV (vs. Ag/AgCl) or higher, and the filler material has a Zn content of from 1 to 10 percent by mass, has a liquid fraction of X at a brazing temperature, and is present in a clad ratio of d (%), where X and d satisfy the conditions: $0.3 \leq X \leq 0.88$ and $15 < d \leq 30$, and the product ($X \times d$) of the liquid fraction X and the clad ratio d (%) satisfies the condition: $6 \leq (X \times d) \leq 23$.

The configuration allows the filler material to remain in a specific amount on the core material and, simultaneously, to form a fluidized filler in a specific amount, because the filler material contains a predetermined element in a specific amount, has a predetermined liquid fraction, and is present in a predetermined clad ratio. This allows a brazing filler alloy containing Zn in a suitable concentration to remain on the core material having a pitting potential of −650 mV (vs. Ag/AgCl) or higher after brazing and thereby gives a satisfactory potential difference between the surface portion (residual filler layer) and the inner portion (core material) after brazing. As the thus-given potential difference between the surface portion and the inner portion is large, the sacrificial effect can be exhibited sufficiently by arranging the residual filler layer on a side to face a corrosive environment. Independently, in brazing, the fluidized filler derived from the filler material and the residue (remainder) thereof are allowed to have Zn concentrations being not so different from each other, this allows the residue (i.e., the residual filler layer) and the fluidized filler to have substantially identical potentials and thereby suppresses the preferential corrosion of the fillet. The aluminum alloy brazing sheet having the configuration according to the present invention can have both satisfactory brazability and good post-brazing corrosion resistance (corrosion resistance both of the surface and of the fillet).

In the aluminum alloy brazing sheet for heat exchangers, the filler material preferably has a Zn content of Y (percent by mass) and a thickness of D ($\mu$m), in which the product between them (Y×D) satisfies the condition: $120 \leq (Y \times D) \leq 480$.

This configuration enables suitable control of the Zn concentrations of the residual filler layer and fillet after brazing, typically even when the filler material has a thickness which varies corresponding to the gauge of the brazing sheet.

In the aluminum alloy brazing sheet for heat exchangers, the filler material preferably has a Mn content controlled to be less than 0.05 percent by mass. The aluminum alloy brazing sheet having this configuration gives a molten filler with higher fluidity and provides satisfactory brazability, because the filler material has a Mn content of less than 0.05 percent by mass.

In the aluminum alloy brazing sheet for heat exchangers, the filler material may further contain Cu in a content of 0.05 percent by mass or more and 0.7 percent by mass or less. After brazing, Cu derived from the filler material is contained in a larger amount in the fillet, and this improves the corrosion resistance of the brazed joint without impairing the sacrificial effect of the residual filler layer.

In the aluminum alloy brazing sheet for heat exchangers, the core material preferably contains Cu in a content of 1.5 percent by mass or less, Si in a content of 1.5 percent by mass or less, Mn in a content of 1.8 percent by mass or less, Ti in a content of 0.35 percent by mass or less, and Mg in a content of 0.5 percent by mass or less, with the remainder being Al and inevitable impurities. The aluminum alloy brazing sheet for heat exchangers having this configuration may have higher strength, better brazability, and better corrosion resistance, because the core material contains predetermined elements in specific amounts.

The present invention further provides an aluminum alloy brazed article for heat exchangers, obtained from the aluminum alloy brazing sheet for heat exchangers through a brazing process, in which the filler material after the brazing process remains as a residual layer on the core material, the residual layer has a thickness of 5% or more of the gauge of the aluminum alloy brazing sheet for heat exchangers, and the residual layer comprises an alpha phase containing Zn in a content of 1 percent by mass or more and being present in an area percentage of 75% or more.

The aluminum alloy brazing sheet for heat exchangers having this configuration can have satisfactory corrosion resistance. This is because the aluminum alloy brazed article is obtained from the aluminum alloy brazing sheet for heat exchangers through brazing, the filler material after brazing remains as a residual layer on the core material, the residual layer has a thickness of 5% or more of the gauge of the aluminum alloy brazing sheet for heat exchangers, and the residual layer includes an alpha phase containing Zn in a content of 1 percent by mass or more and being present in an area percentage of 75% or more, and this gives a sufficient potential difference between the residual layer (residual filler layer) and the core material.

Advantageous Effects of Invention

The present invention provides an aluminum alloy brazing sheet for heat exchangers which has satisfactory brazability and gives a filler-clad surface and a fillet both with good corrosion resistance. The present invention also provides an aluminum alloy brazed article for heat exchangers, using the aluminum alloy brazing sheet for heat exchangers.

REFERENCE SIGNS LIST

1 aluminum alloy brazing sheet for heat exchangers (brazing sheet)
10 aluminum alloy brazed article for heat exchangers (aluminum alloy brazed article)
2 core material
3 filler material
30 residual filler layer

BEST MODES FOR CARRYING OUT THE INVENTION

Embodiments of an aluminum alloy brazing sheet for heat exchangers and an aluminum alloy brazed article for heat exchangers according to the present invention will be illustrated below.

[Brazing Sheet]

Figure 1:
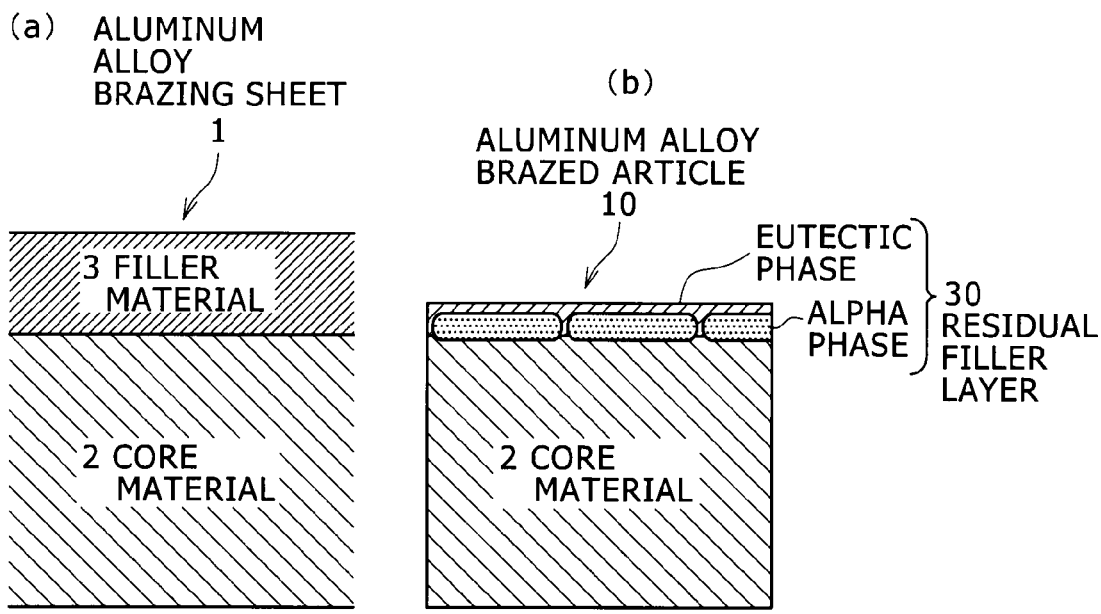
FIGS. 1(*a*) and 1(*b*) are cross-sectional views schematically illustrating the structures of an aluminum alloy brazing sheet for heat exchangers and an aluminum alloy brazed article for heat exchangers, respectively, according to embodiments of the present invention.

An aluminum alloy brazing sheet for heat exchangers (brazing sheet) 1 according to an embodiment of the present invention includes two layers, i.e., a core material (layer) 2, and a filler material (layer) 3 present on one side of the core material 2, as illustrated in FIG. 1(*a*).

The aluminum alloy brazing sheet for heat exchangers according to the present invention is brazed at a predetermined brazing temperature by a known procedure to give an aluminum alloy brazed article for heat exchangers according to the present invention, and the brazed article is used in a heat exchanger. Specifically, the brazing sheet 1 according to one embodiment is formed into a shape of a desired component such as a tube or plate; a flux is applied to a surface of the filler material 3 to remove an oxide film on the surface; this component is assembled with another piece thereof or another aluminum or aluminum alloy component, held at a predetermined brazing temperature for brazing, and thereby yields an aluminum alloy brazed article for heat exchangers (aluminum alloy brazed article) 10 according to another embodiment of the present invention, as illustrated in FIG. 1(*b*). The brazing process causes the filler material 3 to melt or fuse, part of which fluidizes and forms a fillet (not shown) at a joint in the aluminum alloy brazed article 10, and the residue of which remains on the core material 2 and forms a residual filler layer (residual braze layer) 30.

Though not critical, the brazing sheet 1 preferably has a gauge (thickness) of from 0.12 to 0.5 mm when adopted to a tube member of a heat exchanger. Independently, the brazing sheet 1 preferably has a gauge of from 0.8 to 2.0 mm when adopted to a plate member of a heat exchanger. The contents of respective elements and other conditions of the core material 2 and the filler material 3 constituting the brazing sheet 1 according to this embodiment will be illustrated in detail below.

[Core Material]

The core material 2 has a pitting potential of −650 mV (vs. Ag/AgCl) or higher. The core material 2 is not limited, as long as being an aluminum alloy having such a pitting potential, but is preferably an aluminum alloy containing Cu in a content of 1.5 percent by mass or less and is more preferably an aluminum alloy further containing Si in a content of 1.5 percent by mass or less, Mn in a content of 1.8 percent by mass or less, Ti in a content of 0.35 percent by mass or less, and Mg in a content of 0.5 percent by mass or less, each with the remainder being Al and inevitable impurities. The pitting potential and the aluminum alloy chemical composition herein are those of a material for the core material 2 in the manufacturing of the brazing sheet 1. Though not critical, the core material 2 has a thickness of preferably from 0.05 to 1.2 mm.

(Pitting Potential: −650 mV (vs. Ag/AgCl) or Higher)

The core material 2, as having a pitting potential of −650 mV (vs. Ag/AgCl) or higher (more noble), gives a sufficient potential difference between the core material 2 and the residual filler layer 30 in the aluminum alloy brazed article 10 after brazing and thereby provides a satisfactory sacrificial effect (good corrosion resistance). As used herein the phrase "pitting potential of −650 mV or higher" refers to a pitting potential of −650 mV or higher in a positive direction, namely, a pitting potential having an absolute value of 650 mV or less. Specifically, with a more positive pitting potential (with a smaller absolute value thereof), the aluminum alloy has a more noble potential. As used herein the indication "(vs. Ag/AgCl)" means that the potential is a value measured with reference to a silver-silver chloride electrode. In contrast, the core material 2, if having a pitting potential of lower than (less noble than) −650 mV (vs. Ag/AgCl), is difficult to give a sufficient potential difference. The core material 2 may have a more noble potential by adding elements such as Cu, as described later. However, the core material 2 preferably has a pitting potential of lower than (less noble than) −500 mV. This is because, if the core material 2 has a more noble pitting potential of −500 mV or higher typically by the addition of Cu, Cu is present in excess, and this causes a lower melting point of the core material 2 or inferior workability of the brazing sheet; or Cu migrates into the filler material 3 to cause the residual filler layer 30 to have a more noble potential, resulting in an insufficiently large potential difference. As used herein the "pitting potential" is defined as such a potential that a current density in an anode polarization curve in a 5% NaCl aqueous solution (pH 3) at 25° C. be $10^{-4}$ A/cm$^2$.

(Cu Content: 1.5 Percent by Mass or Less)

Copper (Cu) helps the aluminum alloy to have a more noble potential and thereby helps the core material 2 to have better corrosion resistance. In addition, Cu also helps the core material 2 to have a higher post-brazing strength (strength of the aluminum alloy brazed article 10). For exhibiting the effects sufficiently, the core material 2 preferably has a Cu content of 0.2 percent by mass or more. In contrast, if the Cu content be more than 1.5 percent by mass, silicon (Si) and other elements may migrate from the filler material 3 into the core material 2 to cause local increase in alloy element concentrations, and this may cause the core material 2 to undergo local fusion during brazing process at a temperature lower than the melting point of the matrix of the core material 2. To avoid this, the core material 2 has a Cu content of preferably 1.5 percent by mass or less, and more preferably 0.9 percent by mass or less.

(Si Content: 1.5 Percent by Mass or Less)

Silicon (Si) helps the core material 2 to have a higher post-brazing strength and, particularly when coexisting with Mg and Mn, forms Mg—Si intermetallic compounds and Al—Mn—Si intermetallic compounds, and thereby helps the core material 2 to have a further higher post-brazing strength. For exhibiting the effects sufficiently, the core material 2 preferably has a Si content of 0.3 percent by mass or more. In contrast, the core material 2, if having a Si content of more than 1.5 percent by mass, may have a lower melting point, may include increased amounts of low-melting-point phases, and may thereby become more fusible (meltable). To avoid this, the core material 2 has a Si content of preferably 1.5 percent by mass or less and more preferably 1.2 percent by mass or less.

(Mn Content: 1.8 Percent by Mass or Less)

Manganese (Mn) helps the core material 2 to have a higher post-brazing strength, and, with an increasing Mn content, the core material 2 has an increasing post-brazing strength. In addition, Mn helps the aluminum alloy to have a more noble potential and thereby helps the core material 2 to exhibit better corrosion resistance. For exhibiting the effects sufficiently, the core material 2 preferably has a Mn content of 0.5 percent by mass or more. In contrast, the core material 2, if having a Mn content of more than 1.8 percent by mass, may undergo the generation of coarse intermetallic compounds and may thereby have inferior formability (this means the brazing sheet 1 may have inferior formability) and may often have insufficient corrosion resistance. To avoid these, the core material 2 preferably has a Mn content of 1.8 percent by mass or less.

(Ti Content: 0.35 Percent by Mass or Less)

Titanium (Ti) forms a Ti—Al compound which has a more noble potential among aluminum alloys. The Ti—Al compound is present in a laminar distribution, and this renders corrosion be in a layered form and thereby suppresses the corrosion to proceed in a depth direction. For exhibiting the effects sufficiently, the core material 2 preferably has a Ti content of 0.05 percent by mass or more. In contrast, the core material 2, if having a Ti content of more than 0.35 percent by mass, may suffer from the generation of coarse intermetallic compounds, may thereby have inferior formability (this means the brazing sheet 1 may have inferior formability), and may often have insufficient corrosion resistance. To avoid these, the core material 2 preferably has a Ti content of 0.35 percent by mass or less.

(Mg Content: 0.5 Percent by Mass or Less)

Magnesium (Mg) helps the core material 2 to have a higher post-brazing strength. For exhibiting the effects sufficiently, the core material 2 preferably has a Mg content of 0.05 percent by mass or more. In contrast, Mg, if present in the core material 2 in a content of more than 0.5 percent by mass, may migrate into the filler material 3 in the brazing process to react with a flux (K—Al—F flux) coated on the surface of the filler material 3 in the brazing sheet 1, and this may reduce the effect of the flux and thereby often impair the brazability of the brazing sheet 1. To avoid these, the core material 2 preferably has a Mg content of 0.5 percent by mass or less.

(Inevitable Impurities)

The core material 2 may further contain other elements such as Fe, Cr, and Pb as inevitable impurities, in addition to the above composition. Specifically, these elements may be regarded as inevitable impurities, as long as Fe is present in a content of 0.5 percent by mass or less; Cr and Pb are present in contents of each 0.3 percent by mass or less; and these elements are present in a total content of 1.0 percent by mass or less.

[Filler Material]

The filler material (brazing filler material) 3 includes an Al—Si—Zn alloy, has a Zn content of from 1 to 10 percent by mass, has a liquid fraction of X at a brazing temperature, and is present in a clad ratio of d (%), in which X and d satisfy the conditions: $0.3 \leq X \leq 0.88$ and $15 < d \leq 30$, and the product (X×d) of the liquid fraction X and the clad ratio d (%) satisfies the condition $6 \leq (X \times d) \leq 23$. Specifically, the filler material 3 is arranged in the brazing sheet 1 at a clad ratio of more than 15% but 30% or less. The chemical composition, such as the Zn content, of the Al—Si—Zn alloy and the liquid fraction are values of a material for the filler material 3 in the manufacture of the brazing sheet 1. After the brazing process of the brazing sheet 1, namely, in the aluminum alloy brazed article 10, the filler material 3 forms a fillet at a joint and also forms a residual filler layer 30 on the core material 2 (see FIG. 1(*b*)) to function as a sacrificial layer.

(Al—Si—Zn Alloy)

Silicon (Si) significantly helps the aluminum alloy to have a lower melting point, thereby helps the filler material 3 to have a higher liquid fraction and to have more satisfactory filler fluidity at a temperature in the brazing process (brazing temperature) of the brazing sheet 1 according to the present invention Independently, Zn helps the aluminum alloy to have a less noble potential, to have a lower melting point, and to thereby have a higher liquid fraction. The filler material 3 preferably has a Si content of from 3 to 8 percent by mass. The filler material 3, if having a Si content of more than 8 percent by mass, may cause decrease of an alpha phase which remains without an eutectic reaction with Si. For example, when brazing is performed at a brazing temperature of 600° C. and at a Si content of 8 percent by mass and a Zn content of 1 percent by mass, the filler material 3 has a liquid fraction of more than 0.88, and the residual filler layer 30 may fail to include a sufficient amount of the alpha phase. For ensuring the residual filler in a sufficient amount and for allowing the residual filler layer 30 to function as a sacrificial layer having a suitable thickness, the filler material 3 more preferably has a Si content of 7.5 percent by mass or less. In contrast, the filler material 3, if having a Si content of less than 3 percent by mass, may have an excessively low liquid fraction, and this may reduce the amount of the fluidized filler and may impede the formation of a fillet with a sufficient size. For sufficient brazability, the filler material 3 more preferably has a Si content of 5 percent by mass or more. Accordingly, the filler material 3 more preferably has a Si content of from 5 to 7.5 percent by mass.

(Zn Content: 1 Percent by Mass or More and 10 Percent by Mass or Less)

As is described above, Zn helps the aluminum alloy to have a less noble potential, and, as with Si, helps the aluminum alloy to have a lower melting point. The filler material 3, if having a Zn content of less than 1 percent by mass, causes the residual filler layer on the surface of the core material 2 after brazing to contain Zn in a less amount and to have insufficient sacrificial effect. In contrast, the filler material 3, if having a Zn content of more than 10 percent by mass, causes the fluidized filler to contain Zn in a larger amount (in a higher Zn concentration) and thereby causes preferential corrosion. For giving a fillet with good corrosion resistance, the filler material 3 preferably has a Zn content of 6 percent by mass or less. For these reasons, the filler material 3 has a Zn content of 1 percent by mass or more and 10 percent by mass or less, and preferably has a Zn content of 6 percent by mass or less for giving a fillet with better corrosion resistance. The filler material 3 may have a Zn content larger than its Si content. Both Si and Zn help the aluminum alloy to have a lower melting point and to have a higher liquid fraction. Accordingly, the amounts (contents) of these elements are preferably determined through thermodynamic calculations as described later, so that the filler material 3 has a liquid fraction of 0.3 or more and 0.88 or less at the brazing temperature.

(Liquid Fraction at Brazing Temperature: 0.3 or More and 0.88 or Less)

The filler material 3 may melt (fuse) and fluidize in a less amount by allowing the filler material 3 to have a liquid fraction of less than 1 at the brazing temperature. Specifically, at the brazing temperature, which is equal to or higher than the eutectic temperature of the Al—Si alloy, a customary filler material mostly melts and fluidizes because of having a liquid fraction of approximately 1; but in contrast to this, part of the filler material (layer) 3 melts and fluidizes as a result of an eutectic reaction between the alpha phase and a silicon phase, but the residue (portion not reacted with the eutectic silicon) remains as an alpha phase on the core material 2 to form a residual filler layer 30. The filler material 3, if having a liquid fraction of less than 0.3 at the brazing temperature, fails to give a fluidized filler in a sufficient amount and fails to exhibit sufficient brazability. In contrast, the filler material 3, if having a liquid fraction of more than 0.88, causes the residual filler layer 30 functioning as a sacrificial layer to be present in a less amount and to fail to provide sufficient corrosion resistance. To avoid these, the filler material 3 has a liquid fraction at the brazing temperature of 0.3 or more and 0.88 or less, and preferably 0.5 or more and 0.8 or less. The liquid fraction of the filler material 3 is controlled within the range so that the product of the liquid fraction and the clad ratio (%) be 6 or more and 23 or less.

The liquid fraction of the filler material 3 is determined by the brazing temperature and the chemical composition of the aluminum alloy (Al—Si—Zn alloy) constituting the filler material 3. The brazing temperature of the brazing sheet 1 according to the present invention is not critical, as long as being a temperature employed in a regular brazing process using an Al—Si alloy as a filler material. Specifically, the brazing temperature may be a temperature equal to or higher than the eutectic temperature (577° C.) of the Al—Si alloy and lower than the melting temperature (solidus temperature) of the aluminum alloy constituting the core material 2. More specifically, the brazing temperature preferably falls within the range of from 580° C. to 620° C. Within this range, the brazing temperature may be set to such a temperature that the Al—Si—Zn alloy constituting the filler material 3 has a liquid fraction of 0.3 or more and 0.88 or less. With increasing contents of Si and Zn, the melting point of the Al—Si—Zn alloy decreases, namely, the brazing temperature to be set decreases, or the liquid fraction at a certain brazing temperature rises. These are more significantly affected by the Si content. In addition, the melting point of the Al—Si—Zn alloy also falls by the addition of Cu. Accordingly, it is desirable to determine the contents of respective elements, particularly the Si and Zn contents, of the Al—Si—Zn alloy constituting the filler material 3 so that they fall within the above ranges and so that the filler material 3 has a liquid fraction of 0.3 or more and 0.88 or less at a desired brazing temperature. The liquid fraction of the filler material 3 at a brazing temperature is a value as calculated from the composition (for example, Si and Zn contents) of the Al—Si—Zn alloy as a material for the filler material 3 using a standard thermodynamic calculation software such as the Thermo-Calc (trade name, supplied by Thermo-Calc Software AB).

(Clad Ratio: More than 15% but 30% or Less)

The filler material 3, if present in a clad ratio of 15% or less, may not give a fluidized filler in a sufficient amount during the brazing process and may exhibit insufficient brazability, even when the filler material 3 has a high liquid fraction of 0.88, i.e., its upper limit. In contrast, the filler material 3, if present in a clad ratio of more than 30%, has an excessively high liquid fraction. In this case, if the product of the clad ratio and the liquid fraction is larger than a specific level as described later, an excessive fluidized filler may erode the core material 2 to cause local corrosion; or when the filler material 3 has a not so high liquid fraction, the residual filler layer 30 after brazing becomes excessively thick, and this causes significant gauge down by corrosion and thereby causes the aluminum alloy brazed article 10 to have a decreasing strength with time. In contrast, the filler material 3, if being present in a clad ratio of more than 30% and having a low liquid fraction, may cause a low density of eutectic silicon and may thereby increase the amount of a filler not contributing to fluidization even when the filler material 3 melts as a result of the eutectic reaction, resulting in insufficient brazability. To avoid these, the filler material 3 is present in a clad ratio of more than 15% but 30% or less. As specified herein the clad ratio of the filler material 3 refers to a clad ratio per one side (one layer).

(Product of Liquid Fraction and Clad Ratio (%): 6 or More and 23 or Less)

In the brazing sheet 1 according to the present invention, part of the filler material 3 is prevented from melting and fluidizing upon brazing, because of a low liquid fraction (less than 1) of the filler material 3. Accordingly, it is necessary to control the amount of the fluidized filler to such an amount as to give suitable brazability. Specifically, the amount of the fluidized filler is controlled to such an amount as to be sufficient to join a member but not to erode the member (the core material 2). Of the filler material 3 being present in the brazing sheet 1 in a clad ratio (%) of d and having a liquid fraction of X, the clad ratio of substantial filler material which acts as a fluidized filler in the brazing process is expressed by the product (X×d) of the liquid fraction and the clad ratio of the filler material 3. According to the present invention, not only the clad ratio and liquid fraction of the filler material 3 are controlled respectively within specific ranges, but also the clad ratio of the substantial filler material is controlled. The filler material 3, if having a clad ratio of substantial filler material X×d of less than 6, gives a fluidized filler in an insufficient amount and thereby fails to exhibit sufficient brazability. In contrast, the filler material 3, if having a clad ratio of substantial filler material X×d of more than 23, gives a fluidized filler in an excessively large amount, and this erodes the member. To avoid these, the filler material 3 has a product X×d of the liquid fraction X and the clad ratio d (%) of 6 or more and 23 or less ($6 \leq (X \times d) \leq 23$), and the liquid fraction X and the clad ratio d are to be set within the specific ranges ($0.3 \leq X \leq 0.88$, $15 < d \leq 30$) so that the product falls in the above-specified range.

(Product of Zn Content (Percent by Mass) and Thickness (μm) of Filler Material: 120 or More and 480 or Less)

The Al—Si—Zn alloy constituting the filler material 3 contains Zn in a content as specified above. Part of the Zn migrates from the filler material 3 into the core material 2 by the action of hot rolling and annealing in manufacturing processes of the brazing sheet 1, and of heating during the brazing process. Accordingly, the Zn concentration of the filler material 3 in the brazing process is lower than the Zn content. Hereinafter when simply referred to as the "Zn content" of the filler material 3, it refers to the Zn content of the Al—Si—Zn alloy. Particularly when the filler material 3 is thin, the filler material 3 contains Zn in a small absolute amount, and this causes Zn to migrate into the core material 2 in a further larger relative amount and to remain in the filler material 3 in a further smaller relative amount (in a further smaller concentration). The resulting filler material 3 having a further smaller Zn concentration forms a residual filler layer 30, and the residual filler layer 30 thereby has a Zn concentration lower than the Zn content of the filler material 3. The residual filler layer 30, if having a low Zn concentration, may exhibit insufficient sacrificial effect. For having the Zn concentration at a satisfactory level, it is desirable to control the Zn content of the filler material 3 according to the thickness thereof. The amount of Zn per unit area of the brazing sheet 1 may be indicated by [Zn]×D, in which [Zn] represents the Zn content (percent by mass) of the filler material 3; and D represents the thickness of the filler material 3. Namely, it is desirable to control the product of the Zn content [Zn] of the filler material 3 and the thickness D of the filler material 3. More specifically, the product [Zn]×D of the Zn content [Zn] (percent by mass) of the filler material 3 and the thickness D (μm) of the filler material 3 is preferably controlled to 120 or more and 480 or less ($120 \leq ([Zn] \times D) \leq 480$). The thickness of the filler material 3 is determined by the gauge of the brazing sheet 1 and the clad ratio of the filler material 3. However, even when the brazing sheet 1 has a small gauge, the filler material 3 preferably has a thickness of 25 μm or more.

(Mn Content: Less than 0.05 Percent by Mass)

The Filler Material 3 preferably has a Minimized or Lowered Mn Content, Because Mn causes the brazing metal (filler) as a melt of the Al—Si(—Zn) alloy to have lower fluidity. Specifically, by controlling the Mn content to less than 0.05 percent by mass, the molten filler may have satisfactory fluidity and may exhibit satisfactory brazability even in joining of a component having a complicated shape.

(Cu Content: 0.05 Percent by Mass or More and 0.7 Percent by Mass or Less)

The filler material 3 may further contain Cu. Copper (Cu) helps the aluminum alloy to have a more noble potential as described above and exhibits a contradictory action to the action of Zn in the filler material 3. In the brazing process of the brazing sheet 1 according to the present invention, the filler material 3 is present as two phases, i.e., a solid-phase alpha phase (Al containing Zn as a solid solution) and a liquid-phase molten Al—Si—Zn alloy, because of having a liquid fraction of less than 1 at the brazing temperature. The other elements or compounds are distributed to the respective phases according to their properties. For example, Cu, when contained in the Al—Si—Zn alloy constituting the filler material 3, is distributed in a larger amount into the liquid phase than into the alpha phase, because an Al—Cu alloy is an eutectic alloy. Most of the liquid phase fluidizes, whereby the residual filler layer 30, which has been formed mainly from the alpha phase remaining on the surface of the aluminum alloy brazed article 10 (the core material 2) after the brazing process, has a relatively low Cu concentration, thereby has a not so more noble potential, and surely exhibits satisfactory corrosion resistance without significant deterioration in sacrificial effect. In contrast, the fillet, which has been formed from the liquid phase, i.e., from the fluidized filler, has a relatively high Cu concentration, and this helps the joint to have more satisfactory corrosion resistance and thereby further protects the joint from delamination due to corrosion. For exhibiting the effects sufficiently, the filler material 3 has a Cu content of preferably 0.05 percent by mass or more and more preferably 0.1 percent by mass or more. In contrast, the filler material 3, if having a Cu content of more than 0.7 percent by mass, causes the alpha phase, to which Cu has been distributed in a relatively small amount, to have a higher Cu concentration, and this may cause the residual filler layer 30 to have a higher Cu concentration and to exhibit an insufficient sacrificial effect. For these reasons, the filler material 3 has a Cu content of preferably 0.7 percent by mass or less and more preferably 0.4 percent by mass or less. In addition, the filler material 3 preferably has a Cu content of equal to or less than the Cu content of the core material 2, more preferably has a Cu content of less than that of the core material 2 by 0.2 percent by mass or more, and more preferably has a Cu content of less than that of the core material 2 by 0.3 percent by mass or more.

The Al—Si—Zn alloy constituting the filler material 3 may further suitably contain one or more elements allowing the aluminum alloy to have a less noble potential, such as In and Sn, in addition to the above elements. In addition or alternatively, the aluminum alloy may further contain Fe and other elements within ranges not adversely affecting the advantageous effects of the present invention. Specifically, the Al—Si—Zn alloy may contain these elements without adversely affecting the advantageous effects of the present invention, as long as it contains Fe in a content of 0.5 percent by mass or less and other elements each in a content of 0.3 percent by mass or less, in which the total content of these elements is 1.0 percent by mass or less.

With reference to FIG. 1(*a*), the brazing sheet 1 according to this embodiment has a two-layer structure including the core material 2 and, present on one side thereof the filler material 3, but the structure of the brazing sheet is not limited thereto. Specifically, in another embodiment of the present invention, an aluminum alloy brazing sheet may have a three-layer structure including a core material 2; a filler material 3 present on one side of the core material 2; and a second filler material present on the other side of the core material 2. The second filler material present on the other side may be formed from an Al—Si—Zn alloy as with the filler material 3 to function as a sacrificial layer after the brazing process, or may be formed from a common Al—Si alloy as a filler material, such as a 4000-series aluminum alloy. In yet another embodiment, an aluminum alloy brazing sheet may have a three-layer structure including a core material 2; a filler material 3 present on one side of the core material 2; and a sacrificial anode material present on the other side of the core material 2. The sacrificial anode material may be a material commonly used as a sacrificial anode material, such as a 1000-series aluminum or a 7000-series aluminum alloy. In still another aspect, an aluminum alloy brazing sheet may have a four-layer structure including an intermediate material between the core material 2 and the second filler material. The intermediate material may be a regular material composed typically of a 1000-series aluminum or a 7000-series aluminum alloy.

[Aluminum Alloy Brazed Article]

An aluminum alloy brazed article for heat exchangers (aluminum alloy brazed article) 10 according to another embodiment of the present invention is formed from the brazing sheet 1 according to the embodiment through a brazing process at a predetermined brazing temperature and constitutes a heat exchanger. In the aluminum alloy brazed article 10, the filler material 3 of the brazing sheet 1 remains on the core material 2 while having a thickness of 5% or more of the gauge of the brazing sheet 1 before brazing. The residual layer, i.e., the residual filler layer 30 (see FIG. 1(*b*)) includes an alpha phase containing Zn in a content of 1 percent by mass or more and being present in an area percentage of 75% or more. As used herein the term "area percentage" of the alpha phase refers to an area percentage in a cross section of the aluminum alloy brazed article 10. Also as used herein the phrase "alpha phase containing Zn in a content of 1 percent by mass or more" means that the alpha phase has a Zn content of 1 percent by mass or more. Hereinafter the residual filler layer 30 will be described.

(Thickness of Residual Filler Layer: 5% or More of Gauge of Brazing Sheet Before Brazing)

The residual filler layer 30 functions as a sacrificial layer for the core material 2 in the aluminum alloy brazed article 10, and thereby has a longer anti-corrosion life with an increasing thickness thereof. The residual filler layer 30 if having a thickness of less than 5% of the gauge of the brazing sheet 1 before brazing, does not reliably have a sufficient anti-corrosion life. To avoid this, the residual filler layer 30 should have a thickness of 5% or more of the gauge of the brazing sheet 1 before brazing.

(Area Percentage of Alpha Phase in Residual Filler Layer: 75% or More)

With reference to FIG. 1(*b*), the residual filler layer 30 is composed of an alpha phase (Al containing Zn as a solid solution) and an eutectic phase, in which the alpha phase has not been reacted with Si through an eutectic reaction and has not molten during brazing, and the eutectic phase is a portion of the molten liquid phase (Al—Si—Zn) which portion remains on the core material 2 without fluidizing out from the core material 2 and is solidified. The eutectic phase contains a large amount of Si, causes the aluminum alloy to have a more noble potential, and, when contained in a large amount in the residual filler layer 30, causes the residual filler layer 30 to exhibit an insufficient sacrificial effect. The eutectic phase formed by solidification of a fluidized liquid phase (fluidized filler) forms a fillet at a joint in the aluminum alloy brazed article 10. Accordingly, the residual filler layer 30 preferably contains a residual eutectic phase in a small amount, i.e., contains an alpha phase in a large amount, in order to give a fillet of large size. Specifically, the residual filler layer 30, if being present in an area percentage of the alpha phase of less than 75% in its cross section, contains an excessively large amount of the eutectic phase and thereby fails to exhibit a sufficient sacrificial effect. This also causes an insufficient amount of a fluidized filler to form a fillet, resulting in insufficient brazability. To avoid these, the residual filler layer 30 contains an alpha phase in an area percentage 75% or more, and preferably in an area percentage of 85% or more in its cross section.

The area percentage of the alpha phase may be determined by cutting out a specimen from the aluminum alloy brazed article 10 (or an article obtained by subjecting the brazing sheet 1 to a heat treatment at a temperature for a time identical to those in the brazing conditions), and observing a region of the residual filler layer 30 in the cut surface under an optical microscope at a magnification of 25 to 100 times. Specifically, the area percentage may be calculated by measuring the thickness of the residual filler layer 30 and the area of the eutectic phase. Typically, an optical micrograph may be subjected to an image analysis to measure the area percentage of the eutectic phase or another parameter.

(Zn Content of Alpha Phase in Residual Filler Layer: 1 Percent by Mass or More)

Zinc (Zn) is highly soluble in Al to form a solid solution. Zinc in the filler material 3 is therefore contained also in the alpha phase during brazing, allows the alpha phase to have a less noble potential, and thereby allows the residual filler layer 30 to function as a sacrificial layer. The alpha phase, which occupies 75% by area or more of the residual filler layer 30, if having a Zn content of less than 1 percent by mass, has a not-so-less noble potential and thereby fails to impart a sufficient sacrificial effect to the residual filler layer 30. To avoid this, the alpha phase in the residual filler layer 30 has a Zn content of 1 percent by mass or more, and preferably has a Zn content of 1.5 percent by mass or more.

Part of the aluminum alloy composition mutually migrates between the core material 2 and the filler material 3 as a result of hot rolling and annealing in manufacturing processes of the brazing sheet 1, and heating in the brazing process. Accordingly, the residual filler layer 30 may have increase or decrease in content of the alloy composition with respect to the filler material 3 and undergo migration of a composition from the core material 2.

When Cu is contained in the core material 2 and/or the filler material 3 in the brazing sheet 1, Cu is also contained in the residual filler layer 30. In this case, the residual filler layer 30 preferably has a Cu content of 0.4 percent by mass or less. When Cu is contained in the core material 2 even without being added to the filler material 3, Cu is also contained in the filler material 3 upon the brazing process, because Cu migrates from the core material 2 into the filler material 3 as a result of the manufacturing processes of the brazing sheet 1 and heating in the brazing process. In contrast, Cu contained in the filler material 3 is distributed in a relatively larger amount in the fluidized filler during the brazing process but is distributed in a relatively smaller concentration in the residual filler layer 30. However, Cu, if contained in a content of more than 0.4 percent by mass in the residual filler layer 30, may cause the residual filler layer 30 to have a more noble potential to thereby exhibit an insufficient sacrificial effect. Accordingly, the residual filler layer 30, by having a Cu content of 0.4 percent by mass or less, may provide a larger potential difference with respect to the core material 2 without impeding the action of Zn to provide a less noble potential, may thereby exhibit a further satisfactory sacrificial effect, and may allow the aluminum alloy brazed article 10 to have further better corrosion resistance.

The contents of Zn and other elements in the residual filler layer 30 may be measured typically with an X-ray microanalyzer (electron probe X-ray microanalyzer, EPMA). Specifically, the concentration of a specific composition may be calculated by detecting the intensity of each element such as Al in the residual filler layer 30 on a cross section of a test specimen cut out from the aluminum alloy brazed article 10.

As is described above, an aluminum alloy brazed article 10 is obtained by cladding a core material 2 with a filler material 3 to give a brazing sheet 1, and brazing the brazing sheet 1 at a brazing temperature, in which the core material 2 is composed of an aluminum alloy having the predetermined pitting potential, the filler material 3 is composed of an Al—Si—Zn alloy having a Zn content of 1 to 10 percent by mass and having a liquid fraction X of 0.3 or more and 0.88 or less ($0.3 \leq X \leq 0.88$) at the brazing temperature, the clad ratio (%) of the filler material 3 is more than 15 but 30 or less ($15 < d \leq 30$), and the product (X×d) of the clad ratio d and the liquid fraction X is 6 or more and 23 or less ($6 \leq (X \times d) \leq 23$). The aluminum alloy brazed article 10 includes the core material 2 having a more noble potential and, provided thereon, the residual filler layer 30 containing Zn in a suitable concentration and having a sufficient thickness, in which there is imparted a sufficient potential difference between the residual filler layer 30 and the core material 2. The sufficient potential difference as above allows the aluminum alloy brazed article 10 to have good corrosion resistance. In addition, the residual filler layer 30 has a smaller difference in Zn content from the fluidized filler upon brazing and thereby has a substantially equal potential to that of the fluidized filler. This prevents the preferential corrosion of the fillet and thereby allows the joint to have satisfactory corrosion resistance.

In the manufacturing of the brazing sheet 1, the chemical composition of the aluminum alloy for the formation of the core material 2 is determined from the points of strength and corrosion resistance necessary for the aluminum alloy brazed article 10 (heat exchanger). In addition, the contents of elements such as Si and Zn to be contained in the Al—Si—Zn alloy for the formation of the filler material 3 are determined so that the filler material 3 has a predetermined liquid fraction at the brazing temperature. These parameters are determined typically by advance testing.

[Manufacturing Method of Aluminum Alloy Brazing Sheet for Heat Exchangers]

An aluminum alloy brazing sheet according to an embodiment of the present invention may be manufactured by a known method for manufacturing a clad material. An exemplary method for manufacturing a brazing sheet 1 according to the embodiment will be illustrated below.

Initially, aluminum alloys having compositions for a core material 2 and for a filler material 3 of the brazing sheet 1 according to the embodiment of the present invention are melted and cast through continuous casting and thereby yield an ingot for the core material, and an ingot for the filler material. The respective ingots are faced according to necessity and subjected to a homogenization heat treatment. The ingot for the filler material is hot-rolled or cut so as to have a thickness corresponding to a desired clad ratio and thereby yields a thick plate for the filler material.

The thick plate for the filler material is layered on one side of the ingot for the core material, is heated to 400° C. or higher, and the two members are compressed and bonded through hot rolling (clad rolling) and thereby yield an integral sheet. The sheet is then subjected to rough annealing according to necessity, to cold rolling, and, where necessary with the interposition of process annealing, to repeated cold rolling operations to a desired gauge, and thereby yields the brazing sheet 1. The process annealing is preferably performed at a temperature of from 350° C. to 450° C. for 3 hours or longer, or may be omitted. The final cold rolling to give a desired gauge is preferably performed to a reduction ratio of from 30% to 60%. The work may further be subjected to finish annealing after the final cold rolling. The finish annealing allows the material to be softened and to exhibit more satisfactory elongation and thereby allows the brazing sheet 1 to have better processability.

The present invention will be illustrated in further detail with reference to several working examples below, which demonstrate advantageous effects of the present invention, in comparison with comparative examples which do not satisfy the conditions as specified in the present invention.

Experimental Example 1

Preparation of Brazing Sheet

Ingots for the core material were prepared from aluminum alloys (C1 to C19) for the core material according to the known procedure and subjected to a homogenization heat treatment at 500° C. for 8 hours. The aluminum alloys had chemical compositions given in Table 1. The pitting potentials of the aluminum alloys C1 to C19 with reference to a silver-silver chloride electrode (vs. Ag/AgCl) are also indicated in Table 1. Likewise, ingots for the filler material were prepared from aluminum alloys (Al—Si—Zn alloys) for the filler material according to a known procedure, subjected to a homogenization heat treatment, cut to predetermined thicknesses corresponding to clad ratios of respective specimens, and thereby yielded thick plates for the filler material. The aluminum alloys herein had chemical compositions given in Tables 2, 3, and 4. The liquid fractions of the aluminum alloys for the filler material at 600° C. are also shown in Tables 2, 3, and 4, whereas the brazing temperature in the after-mentioned brazing process was set to 600° C.

In combinations for the respective specimens given in Tables 2, 3, and 4, each thick plate for the filler material was layered on each ingot for the core material, the laminate was heated to 450° C., compressed and bonded through hot rolling, and thereby yielded a series of plates. Without rough annealing, the plates were subsequently subjected to cold rolling, to process annealing at 400° C. for 5 hours, further to cold rolling to a reduction ratio of 50% to have final gauges as mentioned below, finally to finish annealing at 300° C. for 3 hours, and thereby yielded specimens (No. 1 to 47, 51 to 63, and 71 to 80) as aluminum alloy brazing sheets for heat exchangers. Regarding the gauges of brazing sheets, Specimens Nos. 1 to 47 (Table 2) each had a gauge of 1.0 mm, Specimens Nos. 51 to 63 (Table 3) each had a gauge of 0.35 mm, and Specimens Nos. 71 to 80 (Table 4) each had a gauge of 0.20 mm.

TABLE 1

| Core material alloy type | Chemical composition of core material aluminum alloy (mass %) | | | | | | Pitting potential VS (Ag/AgCl) (mV) |
| --- | --- | --- | --- | --- | --- | --- | --- |
| | Cu | Si | Mn | Ti | Mg | Al * | |
| C1  | 0.1  | 0.9 | 1.65 | 0.15 | 0.05 | Remainder | −643 |
| C2  | 0.3  | 0.9 | 1.65 | 0.15 | 0.05 | Remainder | −628 |
| C3  | 0.5  | 0.9 | 1.65 | 0.15 | 0.05 | Remainder | −613 |
| C4  | 0.85 | 0.9 | 1.65 | 0.15 | 0.05 | Remainder | −595 |
| C5  | 1.2  | 0.9 | 1.65 | 0.15 | 0.05 | Remainder | −564 |
| C6  | 1.6  | 0.9 | 1.65 | 0.15 | 0.05 | Remainder | −545 |
| C7  | 0.85 | 0.5 | 1.65 | 0.15 | 0.05 | Remainder | −592 |
| C8  | 0.85 | 1.5 | 1.65 | 0.15 | 0.05 | Remainder | −588 |
| C9  | 0.85 | 1.7 | 1.65 | 0.15 | 0.05 | Remainder | −580 |
| C10 | 0.85 | 0.9 | 0.3  | 0.15 | 0.05 | Remainder | −598 |
| C11 | 0.85 | 0.9 | 0.8  | 0.15 | 0.05 | Remainder | −595 |
| C12 | 0.85 | 0.9 | 1.9  | 0.15 | 0.05 | Remainder | −583 |
| C13 | 0.85 | 0.9 | 1.65 | 0.04 | 0.05 | Remainder | −600 |
| C14 | 0.85 | 0.9 | 1.65 | 0.3  | 0.05 | Remainder | −585 |
| C15 | 0.85 | 0.9 | 1.65 | 0.5  | 0.05 | Remainder | −580 |
| C16 | 0.85 | 0.9 | 1.65 | 0.15 | 0.25 | Remainder | −602 |
| C17 | 0.85 | 0.9 | 1.65 | 0.15 | 0.45 | Remainder | −609 |
| C18 | 0.85 | 0.9 | 1.65 | 0.15 | 0.55 | Remainder | −618 |
| C19 | 0.15 | 0.5 | 0.3  | 0.05 | 0.05 | Remainder | −686 |

* Including inevitable impurities
Underlined data are out of scope of the present invention

[Preparation of Aluminum Alloy Brazed Article]

(Brazing Process Method)

A commercially available noncorrosive flux was applied to the surface of the filler material of each of the above-prepared brazing sheets in a mass of coating of 4 g/m$^2$, the work was then hung from a jig, followed by a brazing process by holding the same in a nitrogen atmosphere having an oxygen concentration of 200 ppm or less at a brazing temperature of 600° C. for 2 minutes, and thereby yielded a series of aluminum alloy brazed articles (brazed, heat-treated articles). Independently, the brazing sheets were assembled according to the details of the following test, subjected to a brazing process, and thereby yielded another series of aluminum alloy brazed articles.

(Preparation of Aluminum Alloy Brazed Article for Gap Filling Test)

Figure 2:
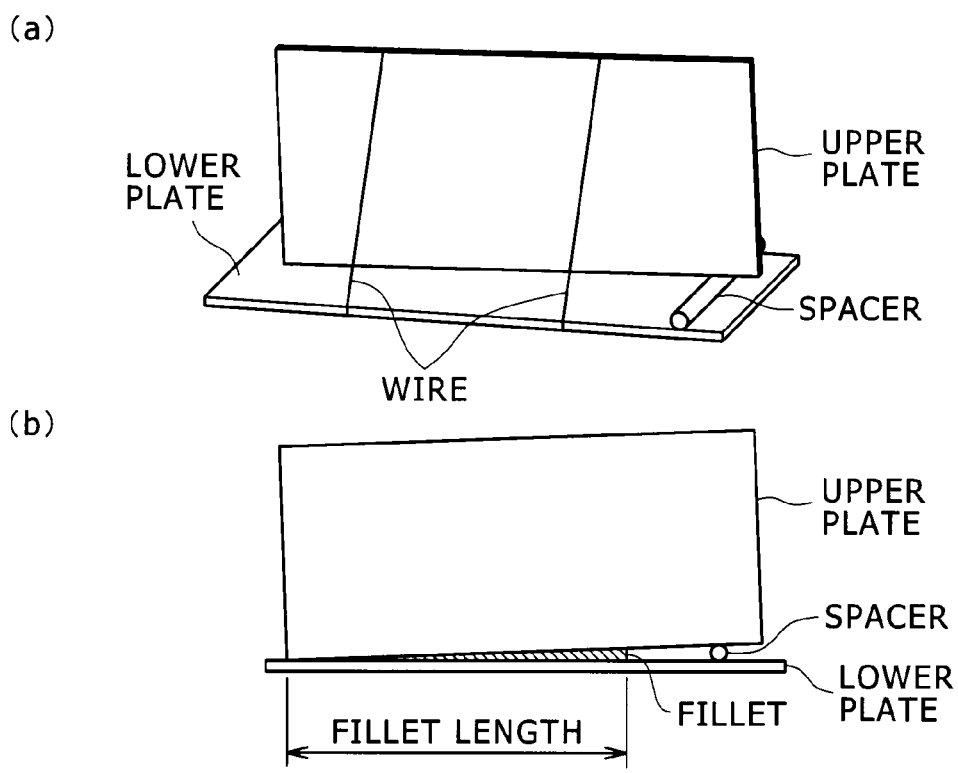
FIG. 2 depicts schematic views of an aluminum alloy brazed article for heat exchangers used for the evaluation of brazability and corrosion resistance of a joint in experimental examples below, in which the views (a) and (b) are a perspective view before brazing and a front view of the aluminum alloy brazed article, respectively.

Each of the brazing sheets of Specimens Nos. 1 to 47 (gauge: 1.0 mm) in Table 2 was cut out to give a test specimen having a width of 20 mm and a length of 60 mm. A flux was applied to the surface of the filler material side of the test specimen, and the resulting test specimen was placed horizontally so that the applied surface faced upward to give a lower plate. With reference to FIG. 2(a), a 3003 alloy plate 1 mm thick, 25 mm wide, and 55 mm long as an upper plate was fixed vertically on the test specimen (lower plate) with the interposition of a spacer, i.e., a round rod 2 mm in diameter. The spacer herein was positioned at a distance of 50 mm from one end (point of contact with the lower plate) of the upper plate (see FIG. 2(b)). This was subjected to brazing under the brazing conditions.

(Preparation of Aluminum Alloy Brazed Article for Shaped Portion Joint Test)

Figure 3:
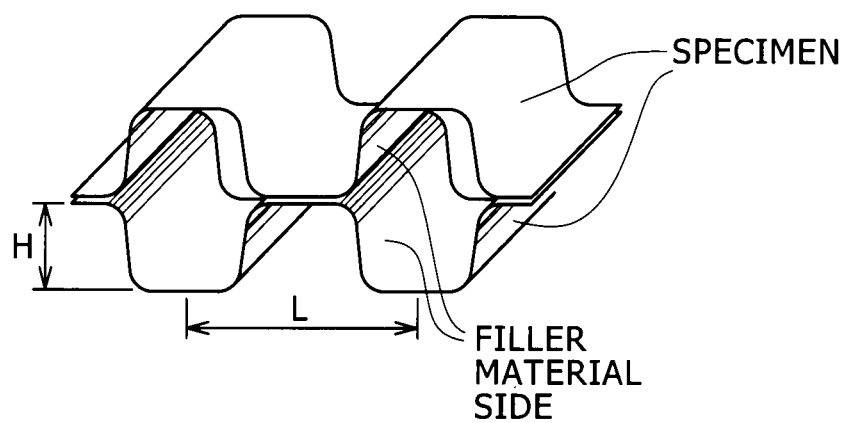
FIG. 3 depicts schematic views of an aluminum alloy brazed article for heat exchangers for the evaluation of brazability and corrosion resistance of a joint in experimental examples, in which the views (a) and (b) are a perspective view before brazing and a cross-sectional view of the essential parts thereof of the aluminum alloy brazed article, respectively.
Figure 3:
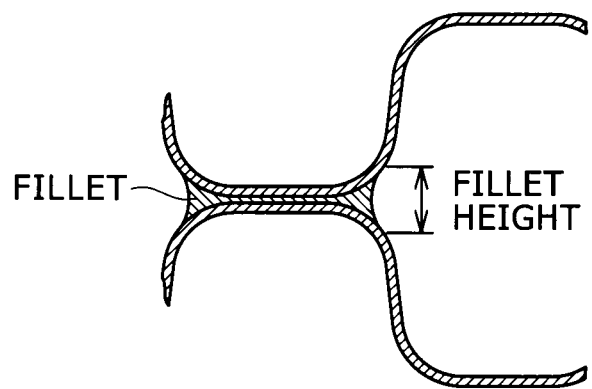

Each of the brazing sheets of Specimens Nos. 51 to 63 (gauge: 0.35 mm) in Table 3 and of Specimens Nos. 71 to 80 (gauge: 0.20 mm) in Table 4 was pressed and shaped into a corrugated sheet illustrated in FIG. 3(a). Specifically, the corrugated sheet had a repetition pitch L of ridges and grooves of 8 mm (ridges and grooves each having a length of 4 mm) and a difference in height H between the top face and bottom face of the ridges and grooves of 3 mm. Two corrugated sheets were prepared for each specimen, were laid plane-symmetrically so that the filler material sides of the two sheets faced each other, and subjected to brazing under the brazing conditions.

[Measurement and Evaluation]

(Thickness of Residual Filler Layer and Area Percentage of Alpha Phase)

A measurement specimen was cut out from each of the brazed, heat-treated articles, and the cross section thereof was observed at arbitrary five view fields under an optical microscope. The thicknesses of the residual filler layers in the five view fields were respectively measured and averaged, and the average of the measured data in the five view fields was expressed as percentage with respect to the gauge (1.0 mm, 0.35 mm, or 0.20 mm) of the sample brazing sheet. Independently, optical microscopic images in arbitrary five view fields were analyzed using a commercially available image analysis software to measure the area percentage of eutectic phases. The area percentages of eutectic phases in the five view fields were averaged, and the average was subtracted from 100(%) to give an area percentage of alpha phase. The measured thicknesses of the residual filler layer, and the area percentages of alpha phase are indicated in Tables 2, 3, and 4.

(Zn Content of Alpha Phase in Residual Filler Layer)

An alpha phase observed in the cross section of the measurement specimen obtained from each of the brazed, heat-treated articles was subjected to a line analysis by EPMA to detect intensities of aluminum alloy elements, and a Zn content was calculated at a point where the Zn concentration reaches maximum. The determined Zn contents are indicated in Tables 2, 3, and 4.

(Evaluation of Brazability)

The fillet sizes of the prepared aluminum alloy brazed articles were measured. Specifically, the lengths of fillets formed in the aluminum alloy brazed articles for gap filling testing obtained from Specimens Nos. 1 to 47 (gauge: 1.0 mm) in Table 2 was measured as illustrated in FIG. 2(b). The results are shown in Table 2. For Specimens Nos. 1 to 47, samples having a fillet length of 20 mm or more were evaluated as accepted.

Independently, the heights of fillets formed in the aluminum alloy brazed articles for shaped portion joint testing obtained from Specimens Nos. 51 to 63 (gauge: 0.35 mm) in Table 3 and Specimens Nos. 71 to 80 (gauge: 0.20 mm) in Table 4 were measured as illustrated in FIG. 3(b). The results are indicated in Tables 3 and 4. For Specimens Nos. 51 to 63, samples having a fillet height of 200 μm or more were evaluated as accepted. For Specimens Nos. 71 to 80, samples having a fillet height of 150 μm or more were evaluated as accepted.

(Evaluation of Corrosion Resistance at Joint)

After the measurement of fillet size for the evaluation of brazability on the aluminum alloy brazed articles (see FIG. 2 and FIG. 3), the surface of a portion of each specimen other than the filler material (residual filler layer) surface and the fillet, which portion was to be in contact with a corrosive environment actually, was sealed with a sealing tape and a paint. The resulting aluminum alloy brazed article was subjected to a copper-accelerated acetic acid salt spray test (CASS test; JIS Z 2371) for 1000 hours as a corrosion test. After the corrosion test, the length or height of the fillet was measured, and a residual ratio with respect to the length or height of the fillet measured for the evaluation of the brazability before the corrosion test was calculated. The determined fillet residual ratios are shown in Tables 2, 3, and 4. Samples having a fillet residual ratio of 70% or more were evaluated as accepted.

(Evaluation of Corrosion Resistance at Flat Portion)

A specimen 60 mm long and 50 mm wide was cut out from each of the brazed, heat-treated articles, and the surface of the core material side and end surface of the specimen were sealed with a sealing tape, whereas the filler material (residual filler layer) surface was defined as a test surface. The resulting specimen was subjected to a CASS test (JIS Z 2371) for 1000 hours as a corrosion test. After the corrosion test, the cross section of the specimen was observed under an optical microscope, and a corrosion depth was measured. The maximum corrosion depth in the observed cross section was indicated on a percentage basis per the gauge (1.0 mm, 0.35 mm, or 0.20 mm) of the sample brazing sheet, and the results are shown in Tables 2, 3, and 4. Samples having a maximum corrosion depth of 50% or less of the gauge of the brazing sheet before brazing were evaluated as accepted.

TABLE 2

| | | Aluminum alloy brazing sheet (gauge 1.0 mm) | | | | | | | Residual filler layer in brazed article | | | Corrosion resistance | | |
|---|---|---|---|---|---|---|---|---|---|---|---|---|---|---|
| | | Core material | Filler Material | | | | | | | | | Flat portion | Joint | |
| | | | Aluminum Alloy composition * (mass %) | | | Liquid fraction (600° C.) | Clad ratio (%) | Thickness (μm) | (Liquid fraction) × (Clad ratio) | [Zn] × (Thickness) | Thickness (% to gauge) | Alpha phase | | Maximum corrosion depth (% to gauge) | Fillet residual ratio (%) | Brazability Fillet length (mm) |
| Specimen Category | No. | Alloy type | Si | Mn | Zn | | | | | | | Area ratio (%) | Zn content (mass %) | | | |
| Example | 1 | C3 | 5 | 0.02 | 2 | 0.51 | 20 | 200 | 10.2 | 400 | 18.2 | 93.1 | 1.8 | 25 | 87 | 22 |
| | 2 | C3 | 7 | 0.02 | 2 | 0.76 | 20 | 200 | 15.2 | 400 | 14.1 | 94.8 | 1.8 | 24 | 95 | 33 |
| | 3 | C3 | 7 | 0.04 | 2 | 0.76 | 20 | 200 | 15.2 | 400 | 15.4 | 83.3 | 1.7 | 22 | 82 | 31 |
| | 4 | C3 | 7 | 0.06 | 2 | 0.76 | 20 | 200 | 15.2 | 400 | 18.7 | 76.0 | 1.6 | 28 | 74 | 23 |
| | 5 | C3 | 6 | 0.02 | 3 | 0.67 | 20 | 200 | 13.4 | 600 | 14.5 | 94.7 | 2.5 | 26 | 85 | 34 |
| | 6 | C4 | 6 | 0.02 | 3 | 0.67 | 20 | 200 | 13.4 | 600 | 14.4 | 94.8 | 2.3 | 22 | 86 | 33 |
| | 7 | C16 | 6 | 0.02 | 3 | 0.67 | 20 | 200 | 13.4 | 600 | 18.1 | 94.3 | 2.3 | 23 | 84 | 29 |
| | 8 | C3 | 7 | 0.02 | 4 | 0.83 | 20 | 200 | 16.6 | 800 | 11.5 | 97.2 | 3.6 | 22 | 69 | 34 |
| | 9 | C3 | 3 | 0.02 | 9 | 0.44 | 20 | 200 | 8.8 | 1800 | 18.4 | 89.9 | 8.4 | 23 | 79 | 25 |
| | 10 | C1 | 7 | 0.02 | 2 | 0.76 | 20 | 200 | 15.2 | 400 | 14.2 | 95.0 | 1.6 | 32 | 84 | 33 |
| | 11 | C2 | 7 | 0.02 | 2 | 0.76 | 20 | 200 | 15.2 | 400 | 14.1 | 93.9 | 1.7 | 29 | 91 | 35 |
| | 12 | C4 | 7 | 0.02 | 2 | 0.76 | 20 | 200 | 15.2 | 400 | 14.1 | 94.4 | 1.8 | 25 | 93 | 34 |
| | 13 | C5 | 7 | 0.02 | 2 | 0.76 | 20 | 200 | 15.2 | 400 | 13.8 | 95.1 | 1.6 | 28 | 98 | 32 |
| | 14 | C6 | 7 | 0.02 | 2 | 0.76 | 20 | 200 | 15.2 | 400 | 13.9 | 95.1 | 1.8 | 49 | 97 | 32 |
| | 15 | C7 | 7 | 0.02 | 2 | 0.76 | 20 | 200 | 15.2 | 400 | 13.9 | 95.2 | 1.6 | 25 | 95 | 34 |
| | 16 | C8 | 7 | 0.02 | 2 | 0.76 | 20 | 200 | 15.2 | 400 | 14 2 | 94.3 | 1.7 | 24 | 94 | 32 |
| | 17 | C9 | 7 | 0.02 | 2 | 0.76 | 20 | 200 | 15.2 | 400 | 14.2 | 94.9 | 1.8 | 43 | 93 | 33 |
| | 18 | C10 | 7 | 0.02 | 2 | 0.76 | 20 | 200 | 15.2 | 400 | 14.1 | 94.7 | 1.6 | 26 | 93 | 34 |
| | 19 | C11 | 7 | 0.02 | 2 | 0.76 | 20 | 200 | 15.2 | 400 | 14.2 | 94.6 | 1.8 | 27 | 93 | 32 |
| | 20 | C12 | 7 | 0.02 | 2 | 0.76 | 20 | 200 | 15.2 | 400 | 13.7 | 93.4 | 1.7 | 39 | 97 | 33 |
| | 21 | C13 | 7 | 0.02 | 2 | 0.76 | 20 | 200 | 15.2 | 400 | 14.3 | 94.9 | 1.8 | 29 | 92 | 33 |
| | 22 | C14 | 7 | 0.02 | 2 | 0.76 | 20 | 200 | 15.2 | 400 | 14.1 | 95.2 | 1.7 | 22 | 94 | 34 |
| | 23 | C15 | 7 | 0.02 | 2 | 0.76 | 20 | 200 | 15.2 | 400 | 14.0 | 94.1 | 1.7 | 27 | 94 | 34 |
| | 24 | C16 | 7 | 0.02 | 2 | 0.76 | 20 | 200 | 15.2 | 400 | 18.2 | 94.2 | 1.7 | 23 | 89 | 29 |
| | 25 | C17 | 7 | 0.02 | 2 | 0.76 | 20 | 200 | 15.2 | 400 | 18.5 | 79.2 | 1.6 | 25 | 87 | 25 |
| | 26 | C18 | 7 | 0.02 | 2 | 0.76 | 20 | 200 | 15.2 | 400 | 18.9 | 76.3 | 1.8 | 23 | 79 | 22 |
| | 27 | C6 | 5 | 0.02 | 2 | 0.51 | 20 | 200 | 10.2 | 400 | 17.9 | 92.5 | 1.8 | 38 | 91 | 23 |
| | 28 | C9 | 5 | 0.02 | 2 | 0.51 | 20 | 200 | 10.2 | 400 | 18.1 | 93.8 | 1.8 | 28 | 68 | 25 |
| | 29 | C4 | 3.5 | 0.02 | 2 | 0.34 | 20 | 200 | 6.8 | 400 | 19.1 | 81.0 | 1.8 | 24 | 92 | 21 |
| | 30 | C4 | 8 | 0.02 | 2 | 0.88 | 25 | 250 | 22.0 | 500 | 17.2 | 98.2 | 1.6 | 26 | 93 | 33 |
| Comparative Ex- | 31 | C3 | 1.5 | 0.02 | 2 | 0.07 | 20 | 200 | 1.4 | 400 | 19.5 | 98.3 | 1.7 | 29 | 85 | 18 |
| | 32 | C3 | 10 | 0.02 | 2 | 1 | 20 | 200 | 20.0 | 400 | 3.6 | 98.2 | 0.9 | 58 | 55 | 36 |
| | 33 | C3 | 7 | 0.02 | 8 | 1 | 20 | 200 | 20.0 | 1600 | 4.8 | 97.2 | 3.9 | 65 | 15 | 35 |
| | 34 | C3 | 5 | 0.02 | 11 | 0.82 | 20 | 200 | 16.4 | 2200 | 12.3 | 97.1 | 8.7 | 23 | 13 | 35 |

TABLE 2-continued

| | | | Aluminum alloy brazing sheet (gauge 1.0 mm) | | | | | | Residual filler layer in brazed article | | | Corrosion resistance | | |
|---|---|---|---|---|---|---|---|---|---|---|---|---|---|---|
| | | Core ma- | Filler Material | | | | | | Thick- | Alpha phase | | Flat portion Maximum corrosion | Joint Fillet resid- | Braza- bility |
| Specimen | | terial | Aluminum Alloy composition * (mass %) | | | Liquid fraction | Clad ratio | Thick- ness | (Liquid fraction) × (Clad ratio) | [Zn] × (Thick- ness) | ness (% to gauge) | Area ratio (%) | Zn content (mass %) | depth (% to gauge) | ual ratio (%) | Fillet length (mm) |
| Cate- gory | No. | Alloy type | Si | Mn | Zn | (600° C.) | (%) | (μm) | | | | | | | | |
| ample | 35 | C3 | 2 | 0.02 | 9 | 0.28 | 20 | 200 | <u>5.6</u> | 1800 | 18.9 | <u>73.2</u> | 4.3 | 31 | 13 | 18 |
| | 36 | C3 | 9 | 0.02 | 1 | <u>0.97</u> | 20 | 200 | 19.4 | 200 | <u>3.9</u> | 98.0 | <u>0.5</u> | 57 | 65 | 34 |
| | 37 | <u>C19</u> | 7 | 0.02 | 2 | 0.76 | 20 | 200 | 15.2 | 400 | 14.5 | 95.0 | 1.7 | 63 | 61 | 34 |
| | 38 | C3 | 2.5 | 0.2 | 3 | <u>0.23</u> | 20 | 200 | <u>4.6</u> | 600 | 18.9 | <u>71.4</u> | 2.6 | 29 | 95 | 19 |
| | 39 | C3 | 3 | 0.1 | 2 | <u>0.27</u> | 20 | 200 | <u>5.4</u> | 400 | 19.2 | <u>69.9</u> | 2.6 | 26 | 93 | 17 |
| | 40 | C3 | 7 | 0.02 | 6 | <u>0.90</u> | 20 | 200 | 18.0 | 1200 | <u>3.7</u> | 98.4 | 3.2 | 23 | 31 | 36 |
| | 41 | C3 | 6 | 0.02 | 9 | <u>0.89</u> | 20 | 200 | 17.8 | 1800 | <u>4.2</u> | 98.3 | 4.1 | 24 | 27 | 34 |
| | 42 | C3 | 3.5 | 0.02 | 2 | 0.34 | <u>15</u> | 150 | <u>5.1</u> | 300 | 13.9 | 79.2 | 1.8 | 23 | 87 | 15 |
| | 43 | C3 | 8 | 0.02 | 2 | 0.88 | 30 | 300 | <u>26.4</u> | 600 | 20.5 | 96.1 | 1.7 | 51 | 73 | 36 |
| | 44 | C3 | 7.5 | 0.02 | <u>0.5</u> | 0.80 | 20 | 200 | 16.0 | 100 | 14.3 | 97.5 | <u>0.43</u> | 59 | 66 | 33 |
| | 45 | C3 | 8 | 0.02 | 2 | 0.88 | <u>13</u> | 130 | 11.4 | 260 | 11.2 | 80.9 | 1.7 | 27 | 9t | 17 |
| | 46 | C3 | 8 | 0.02 | 2 | 0.88 | <u>35</u> | 350 | <u>30.8</u> | 700 | 21.3 | 87.3 | 1.6 | 55 | 94 | 38 |
| | 47 | C3 | 3.5 | 0.02 | 2 | 0.34 | <u>35</u> | 350 | 11.9 | 700 | 31.9 | <u>70.9</u> | 1.7 | 32 | 93 | 14 |

Underlined data are out of the scope of the present invention
Boldfaced data are rejected
* The remainder being Al and inevitable impurities

TABLE 3

| | | | Aluminum alloy brazing sheet (gauge 0.35 mm) | | | | | | Residual filler layer in brazed article | | | Corrosion resistance | | |
|---|---|---|---|---|---|---|---|---|---|---|---|---|---|---|
| | | Core ma- | Filler Material | | | | | | Thick- | Alpha phase | | Flat portion Maximum corrosion | Joint Fillet resid- | Braza- bility |
| Specimen | | terial | Aluminum Alloy composition * (mass %) | | | Liquid fraction | Clad ratio | Thick- ness | (Liquid fraction) × (Clad ratio) | [Zn] × (Thick- ness) | ness (% to gauge) | Area ratio (%) | Zn content (mass %) | depth (% to gauge) | ual ratio (%) | Fillet length (μm) |
| Cate- gory | No. | Alloy type | Si | Mn | Zn | (600° C.) | (%) | (μm) | | | | | | | | |
| Ex- ample | 51 | C3 | 6 | 0.02 | 3 | 0.67 | 17 | 60 | 11.5 | 180 | 12.5 | 93.2 | 1.6 | 27 | 93 | 420 |
| | 52 | C4 | 6 | 0.02 | 3 | 0.67 | 17 | 60 | 11.5 | 180 | 13.1 | 94.7 | 1.7 | 28 | 95 | 460 |
| | 53 | C16 | 6 | 0.02 | 3 | 0.67 | 17 | 60 | 11.5 | 180 | 12.5 | 87.3 | 1.5 | 25 | 89 | 390 |
| | 54 | C3 | 6 | 0.02 | 3 | 0.67 | 23 | 80 | 15.3 | 240 | 16.6 | 94.1 | 1.8 | 24 | 97 | 710 |
| | 55 | C4 | 6 | 0.02 | 3 | 0.67 | 23 | 80 | 15.3 | 240 | 15.9 | 95.3 | 1.7 | 24 | 96 | 715 |
| | 56 | C16 | 6 | 0.02 | 3 | 0.67 | 23 | 80 | 15.3 | 240 | 16.4 | 94.3 | 1.7 | 22 | 95 | 650 |
| | 57 | C3 | 4 | 0.02 | 5 | 0.50 | 17 | 60 | 8.6 | 300 | 15.3 | 88.6 | 2.4 | 22 | 79 | 320 |
| | 58 | C3 | 6 | 0.02 | 5 | 0.78 | 17 | 60 | 13.4 | 300 | 10.3 | 95.1 | 2.2 | 21 | 76 | 590 |
| Com- para- tive Ex- ample | 59 | C3 | 3.5 | 0.02 | 3 | 0.35 | 16 | 56 | <u>5.6</u> | 168 | 14.7 | 78.6 | 1.8 | 26 | 89 | 190 |
| | 60 | C3 | 1.5 | 0.02 | 2 | <u>0.07</u> | 17 | 60 | <u>1.2</u> | 120 | 16.5 | 98.3 | 1.7 | 24 | 72 | 54 |
| | 61 | C3 | 6 | 0.02 | 9 | 0.89 | 17 | 60 | 15.3 | 540 | <u>3.5</u> | 95.3 | 4.6 | 52 | 78 | 760 |
| | 62 | C3 | 7 | 0.02 | 2 | 0.76 | <u>14</u> | 50 | 10.9 | 100 | 11.9 | 96.2 | <u>0.9</u> | 64 | 96 | 490 |
| | 63 | C3 | 7.5 | 0.02 | <u>0.5</u> | 0.80 | 17 | 60 | 13.7 | 30 | 10.6 | 96.2 | <u>0.36</u> | 55 | 80 | 610 |

* The remainder being Al and inevitable impurities
Boldfaced data are rejected
Underlined data are out of the scope of the present invention

TABLE 4

| | | | Aluminum alloy brazing sheet (gauge 0.20 mm) | | | | | | Residual filler layer in brazed article | | | Corrosion resistance | | |
| | | Core ma- | Filler Material | | | | | | | | | Flat portion | Joint | |
| | | terial | Aluminum Alloy composition * | | | | | (Liquid | | Thick- | Alpha phase | | Maximum corrosion | Fillet resid- | Braza- bility |
| Specimen | | Alloy | (mass %) | | | Liquid fraction | Clad ratio | Thick- ness | fraction) × (Clad | [Zn] × (Thick- | ness (% to | Area | Zn content | depth (% to | ual ratio | Fillet length |
| Cate- gory | No. | type | Si | Mn | Zn | (600° C.) | (%) | (μm) | ratio) | ness) | gauge) | ratio (%) | (mass %) | gauge) | (%) | (μm) |
|---|---|---|---|---|---|---|---|---|---|---|---|---|---|---|---|---|
| Ex- ample | 71 | C3 | 4 | 0.02 | 5 | 0.50 | 18 | 35 | 8.8 | 175 | 16.1 | 88.6 | 2.3 | 37.5 | 79 | 450 |
| | 72 | C3 | 6 | 0.02 | 5 | 0.78 | 18 | 35 | 13.7 | 175 | 12.9 | 92.3 | 2.2 | 40 | 81 | 580 |
| | 73 | C16 | 6 | 0.02 | 5 | 0.78 | 18 | 35 | 13.7 | 175 | 12.5 | 94.6 | 2.3 | 36 | 72 | 575 |
| | 74 | C3 | 7 | 0.02 | 4 | 0.83 | 18 | 35 | 14.5 | 140 | 7.9 | 98.3 | 2.1 | 42.5 | 85 | 590 |
| | 75 | C3 | 6 | 0.02 | 3 | 0.67 | 18 | 35 | 11.7 | 105 | 13.7 | 94.0 | 1.4 | 45 | 91 | 520 |
| | 76 | C16 | 7 | 0.02 | 4 | 0.83 | 18 | 35 | 14.5 | 140 | 8.3 | 97.5 | 2.2 | 43.5 | 85 | 585 |
| Com- parative Ex- ample | 77 | C3 | 2.5 | 0.2 | 3 | 0.23 | 18 | 35 | 4.0 | 105 | 17.8 | 70.2 | 1.5 | 32.5 | 74 | 130 |
| | 78 | C3 | 10 | 0.02 | 2 | 1 | 18 | 35 | 17.5 | 70 | 3.1 | 97.5 | 0.9 | 58 | 23 | 700 |
| | 79 | C3 | 3.5 | 0.02 | 3 | 0.35 | 15 | 30 | 5.3 | 90 | 14.2 | 77.5 | 1.6 | 41.5 | 86 | 145 |
| | 80 | C3 | 7 | 0.02 | 4 | 0.80 | 30 | 60 | 24.0 | 240 | 22.3 | 97.6 | 2.0 | 63 | 73 | 740 |

* The remainder being Al and inevitable impurities
Boldfaced data are rejected
Underlined data are out of the scope of the present invention Tables 2, 3, and 4 demonstrate as follows. Specimens Nos. 1 to 30, 51 to 58, and 71 to 76 each satisfied conditions for aluminum alloy brazing sheets for heat exchangers according to the present invention on the pitting potential of the aluminum alloy constituting the core material (see Table 1), the Zn content and the liquid fraction at the brazing temperature (600° C.) of the Al—Si—Zn alloy constituting the filler material, and the clad ratio of the filler material and a product thereof with the liquid fraction. These specimens were brazed and thereby yielded aluminum alloy brazed articles according to the present invention, which brazed articles each include a core material, and formed thereon, a residual filler layer having a sufficient thickness and including an alpha phase with a suitable Zn concentration. The brazed articles were satisfactory in all the corrosion resistance of the joint, the corrosion resistance of the flat portion, and the brazability. In contrast, Specimens Nos. 31 to 47, 59 to 63, and 77 to 80 did not satisfy one or more of the conditions for aluminum alloy brazing sheets for heat exchangers according to the present invention and thereby gave aluminum alloy brazed articles which were unsatisfactory in brazability and/or corrosion resistance.

(Evaluation by Chemical Composition of Core Material)

Specimen No. 37 had insufficient Cu and Mn contents in the core material (C19), thereby had a pitting potential less noble than the range specified in the present invention, and exhibited an insufficient potential difference with respect to the residual filler layer, resulting in an insufficient sacrificial effect of the residual filler layer. The specimen thereby exhibited poor corrosion resistance in the flat portion.

(Evaluation by Chemical Composition and Clad Ratio of Filler Material)

Specimens Nos. 31, 35, 38, 39, 60, and 77 each had an insufficient liquid fraction of the filler material, thereby failed to ensure a sufficient fluidized filler during brazing, and indicated poor brazability. Specimen No. 35 had a Zn content of the filler material near to the upper limit, thereby gave a small fillet with a high Zn concentration, and indicated poor corrosion resistance at the joint. In contrast, Specimens Nos. 32, 33, 36, 40, 41, 61, and 78 each had an excessively high liquid fraction of the filler material, thereby gave a brazing metal which excessively fluidized during brazing to give a residual filler layer having an insufficient thickness, and indicated poor corrosion resistance of at least one of the flat portion and the joint.

Specimen No. 34 had an excessively high Zn content of the filler material and thereby gave a fluidized filler with a higher Zn concentration, namely gave a fillet with a higher Zn concentration, resulting in poor corrosion resistance at the joint. In contrast, Specimens Nos. 44 and 63 each had an insufficient Zn content of the filler material, thereby gave, after brazing, a residual filler layer having an insufficient Zn concentration and exhibiting insufficient sacrificial effect, resulting in poor corrosion resistance in the flat portion.

Specimens Nos. 42, 45, and 79 each had an insufficient clad ratio of the filler material and thereby exhibited poor brazability. Specimen No. 62 exhibited certain brazability, because the filler material had a relatively high liquid fraction in spite of having an insufficient clad ratio. However, this specimen had poor corrosion resistance in the flat portion, because the filler material had an excessively small thickness and a low Zn content in the vicinity of the lower limit, and gave a residual filler layer with an insufficient Zn concentration. In contrast, Specimen No. 47 exhibited poor brazability, because the filler material had an excessively high clad ratio and a low liquid fraction in the vicinity of the lower limit, thereby gave a larger amount of a brazing metal not contributing to fluidization, and this remained as a residual filler layer on the core material. Specimen No. 46 exhibited a large corrosion depth (was largely corroded) in the flat portion, because the filler material had an excessively high clad ratio, had a high liquid fraction near to the upper limit with an excessively high product between them, thereby gave an excessively large amount of fluidized filler, which eroded the core material. Likewise, Specimens Nos. 43 and 80 exhibited poor corrosion resistance in the flat portion, because the filler material had an excessively large product between the liquid fraction and the clad ratio, although these parameters are each within the range specified in the present invention and thereby gave an excessively large amount of fluidized filler which eroded the core material. In contrast, Specimen No. 59 indicated poor brazability, because the filler material had an insufficient product between the liquid fraction and the clad ratio, although these parameters are within the ranges specified in the present invention, and the specimen thereby gave an insufficient amount of fluidized filler.

Experimental Example 2

Next, another experimental example was performed to verify the advantageous effects of the present invention, in which aluminum alloys for the filler material further added with Cu in different contents were used.

[Preparation of Aluminum Alloy Brazing Sheet]

Brazing sheets (gauge: 1.0 mm) of Specimens Nos. 81 to 89 in Table 5 and brazing sheets (gauge: 0.35 mm) of Specimens Nos. 91 to 99 in Table 6 were prepared by the procedure of Experimental Example 1, using aluminum alloys (C3 and C4) having the chemical compositions given in Table 1, and aluminum alloys (Al—Si—Zn alloys) for the filler material having chemical compositions given in Tables 5 and 6. The obtained brazing sheets were subjected to a brazing process by holding at a brazing temperature of 600° C. for 2 minutes by the procedure of Experimental Example 1 and thereby yielded brazed, heat-treated articles. In addition, aluminum alloy brazed articles illustrated in FIG. 2 were prepared from Specimens Nos. 81 to 89, and aluminum alloy brazed articles illustrated in FIG. 3 were prepared from Specimens Nos. 91 to 99.

[Measurement and Evaluation]

On the above-prepared brazed, heat-treated articles, the thickness of the residual filler layer, and the area percentage and Zn content of the alpha phase were measured, and the corrosion resistance in the flat portion was evaluated by performing a corrosion test, respectively by the procedures of Experimental Example 1. Independently, on the aluminum alloy brazed articles, the brazability was evaluated and the corrosion resistance at the joint was evaluated by performing a corrosion test. The results are indicated in Tables 5 and 6.

TABLE 5

| | | Aluminum alloy brazing sheet (gauge 1.0 mm) | | | | | | | Residual filler layer in brazed article | | | Corrosion resistance | | |
|---|---|---|---|---|---|---|---|---|---|---|---|---|---|---|
| | | Core material | Filler Material | | | | | | | | | Flat portion | Joint | |
| | | | Aluminum Alloy composition * (mass %) | | | | | (Liquid fraction) × (Clad ratio) | [Zn] × (Thickness) | Thickness (% to gauge) | Alpha phase | | Maximum corrosion depth (% to gauge) | Fillet residual ratio (%) | Brazability Fillet length (mm) |
| Specimen Category | Alloy No. type | Si | Mn | Zn | Cu | Liquid fraction (600° C.) | Clad ratio (%) | Thickness (μm) | | | | Area ratio (%) | Zn content (mass %) | | | |
| Example | 81 C3 | 6.8 | 0.02 | 2 | 0.05 | 0.76 | 20 | 200 | 15.2 | 400 | 14.2 | 94.3 | 1.8 | 27 | 96 | 33 |
| | 82 C3 | 6.7 | 0.02 | 2 | 0.1 | 0.76 | 20 | 200 | 15.2 | 400 | 14.3 | 94.7 | 1.8 | 28 | 97 | 34 |
| | 83 C3 | 6.7 | 0.02 | 2 | 0.2 | 0.76 | 20 | 200 | 15.2 | 400 | 14.1 | 94.2 | 1.8 | 28 | 98 | 32 |
| | 84 C3 | 6.6 | 0.02 | 2 | 0.4 | 0.76 | 20 | 200 | 15.2 | 400 | 14.2 | 94.2 | 1.9 | 35 | 99 | 34 |
| | 85 C4 | 6.8 | 0.02 | 2 | 0.05 | 0.76 | 20 | 200 | 15.2 | 400 | 14.4 | 94.1 | 1.8 | 26 | 96 | 35 |
| | 86 C4 | 6.7 | 0.02 | 2 | 0.2 | 0.76 | 20 | 200 | 15.2 | 400 | 14.1 | 94.1 | 1.7 | 27 | 97 | 31 |
| | 87 C4 | 6.6 | 0.02 | 2 | 0.4 | 0.76 | 20 | 200 | 15.2 | 400 | 14.1 | 94.2 | 1.7 | 37 | 99 | 34 |
| Comparative Example | 88 C3 | 6.4 | 0.02 | 2 | <u>0.8</u> | 0.76 | 20 | 200 | 15.2 | 400 | 14.2 | 94.1 | 1.8 | 54 | 98 | 34 |
| | 89 C4 | 6.4 | 0.02 | 2 | <u>0.8</u> | 0.76 | 20 | 200 | 15.2 | 400 | 14.3 | 94.1 | 1.8 | 52 | 100 | 33 |

* The remainder being Al and inevitable impurities
Boldfaced data are rejected
Underlined data are out of the scope of the present invention

TABLE 6

| | | Aluminum alloy brazing sheet (gauge 0.35 mm) | | | | | | | Residual filler layer in brazed article | | | Corrosion resistance | | |
|---|---|---|---|---|---|---|---|---|---|---|---|---|---|---|
| | | Core material | Filler Material | | | | | | | | | Flat portion | Joint | |
| | | | Aluminum Alloy composition * (mass %) | | | | | (Liquid fraction) × (Clad ratio) | [Zn] × (Thickness) | Thickness (% to gauge) | Alpha phase | | Maximum corrosion depth (% to gauge) | Fillet residual ratio (%) | Brazability Fillet length (μm) |
| Specimen Category | Alloy No. type | Si | Mn | Zn | Cu | Liquid fraction (600° C.) | Clad ratio (%) | Thickness (μm) | | | | Area ratio (%) | Zn content (mass %) | | | |
| Example | 91 C3 | 5.8 | 0.02 | 3 | 0.05 | 0.67 | 23 | 80 | 15.3 | 240 | 16.5 | 94.3 | 1.8 | 25 | 97 | 712 |
| | 92 C3 | 5.8 | 0.02 | 3 | 0.1 | 0.67 | 23 | 80 | 15.3 | 240 | 16.5 | 94.3 | 1.8 | 27 | 98 | 715 |

TABLE 6-continued

| | | Aluminum alloy brazing sheet (gauge 0.35 mm) | | | | | | | | Residual filler layer in brazed article | | | Corrosion resistance | | |
|---|---|---|---|---|---|---|---|---|---|---|---|---|---|---|---|
| | Core material | Filler Material | | | | | | | | | | | Flat portion | Joint | |
| | | Aluminum Alloy composition * | | | | Liquid fraction | Clad ratio | Thickness | (Liquid fraction) × (Clad ratio) | [Zn] × (Thickness) | Thickness | Alpha phase | | Maximum corrosion depth | Fillet residual ratio | Brazability Fillet length |
| Category | Specimen No. | Alloy type | Si | Mn | Zn | Cu | (600° C.) | (%) | (μm) | | | (% to gauge) | Area ratio (%) | Zn content (mass %) | (% to gauge) | (%) | (μm) |
| | | | (mass %) | | | | | | | | | | | | | |
| | 93 | C3 | 5.7 | 0.02 | 3 | 0.2 | 0.67 | 23 | 80 | 15.3 | 240 | 16.7 | 94.1 | 1.8 | 30 | 99 | 710 |
| | 94 | C3 | 5.6 | 0.02 | 3 | 0.4 | 0.67 | 23 | 80 | 15.3 | 240 | 16.2 | 93.8 | 1.7 | 36 | 100 | 710 |
| | 95 | C4 | 5.8 | 0.02 | 3 | 0.05 | 0.67 | 23 | 80 | 15.3 | 240 | 16.6 | 94.8 | 1.7 | 24 | 97 | 720 |
| | 96 | C4 | 5.7 | 0.02 | 3 | 0.2 | 0.67 | 23 | 80 | 15.3 | 240 | 16.8 | 94.7 | 1.8 | 28 | 99 | 710 |
| | 97 | C4 | 5.6 | 0.02 | 3 | 0.4 | 0.67 | 23 | 80 | 15.3 | 240 | 15.9 | 94.5 | 1.7 | 36 | 100 | 715 |
| Comparative Example | 98 | C3 | 5.4 | 0.02 | 3 | 0.8 | 0.66 | 23 | 80 | 15.1 | 240 | 16.1 | 94.5 | 1.7 | 57 | 100 | 715 |
| | 99 | C4 | 5.4 | 0.02 | 3 | 0.8 | 0.66 | 23 | 80 | 15.1 | 240 | 16.3 | 93.9 | 1.8 | 53 | 100 | 720 |

* The remainder being Al and inevitable impurities
Boldfaced data are rejected
Underlined data are out of the scope of the present invention (Evaluation by Chemical Composition of Filler Material)

Specimens Nos. 81 to 84 and 88, and Specimens Nos. 85 to 87 and 89 in Table 5 are examples and comparative examples corresponding to Specimen No. 2 and Specimen No. 12, respectively, in Table 2 of Experimental Example 1, except for further containing Cu in increasing amounts in this order in the aluminum alloy for constituting the filler material. Likewise, Specimens Nos. 91 to 94 and 98, and Specimens Nos. 95 to 97 and 99 in Table 6 are examples and comparative examples corresponding to Specimen No. 54 and Specimen No. 55, respectively, in Table 3, except for further containing Cu in increasing amounts in this order in the aluminum alloy for constituting the filler material. Tables 5 and 6 demonstrate that, with an increasing Cu content of the filler material, the residual filler layer after brazing tended to have a decreasing sacrificial effect but the fillet tended to have an increasing corrosion resistance. If the Cu content increased over the range specified in the present invention as in Specimens Nos. 88, 89, 98, and 99, the corrosion resistance of the flat portion was as poor as in Specimens Nos. 44 and 63 (see Tables 2 and 3) having an insufficient Zn content of the filler material, indicating that the residual filler layer lost its sacrificial effect due to Zn addition.

While the present invention has been described in detail with reference to the specific embodiments and working examples thereof, it is to be understood that the invention be not limited by any of the details of description, but rather be construed broadly within its spirit and scope as set out in the appended claims. In addition, it is obvious that various changes, modifications, or equivalent arrangements may be made therein without departing from the spirit and scope of the invention.

The invention claimed is:

1. An aluminum alloy brazing sheet, comprising:
   a core material having a pitting potential of −650 mV (vs. Ag/AgCl) or higher; and
   a filler material on at least one side of the core material comprising an Al—Si—Zn alloy,
   wherein the filler material comprises a Zn content of from 1 to 10 percent by mass, a Si content of 3 to 7.5 percent by mass, and a Cu content of 0.05 percent by mass or more and 0.4 percent by mass or less, has a liquid fraction of X at a brazing temperature, and is present in a clad ratio of d (%), wherein X and d satisfy the conditions: 0.3≤X≤0.88 and 15<d≤30, and
   wherein the product (X×d) of the liquid fraction X and the clad ratio d (%) satisfies the condition: 6≤(X×d)≤23.

2. The sheet of claim 1, wherein the filler material comprises a Zn content of Y by mass percent and has a thickness of D (μm), and
   wherein the product (Y×D) of Y and D satisfies the condition: 120≤(Y×D)≤480.

3. The sheet of claim 2, wherein the filler material comprises a Mn content less than 0.05 percent by mass.

4. The sheet of claim 2, wherein the core material comprises a Cu content of 1.5 percent by mass or less, a Si content of 1.5 percent by mass or less, a Mn content of 1.8 percent by mass or less, a Ti content of 0.35 percent by mass or less, and a Mg content of 0.5 percent by mass or less, with the remainder comprising Al and inevitable impurities.

5. The sheet of claim 2, wherein the filler material comprises a Si content of 3 percent by mass or more and 7 percent by mass or less.

6. The sheet of claim 2, wherein the filler material comprises a Si content of 3 percent by mass or more and 6.8 percent by mass or less.

7. The sheet of claim 1, wherein the filler material comprises a Mn content of less than 0.05 percent by mass.

8. The sheet of claim 7, wherein the core material comprises a Cu content of 1.5 percent by mass or less, a Si content of 1.5 percent by mass or less, a Mn content of 1.8 percent by mass or less, a Ti content of 0.35 percent by mass or less, and a Mg content of 0.5 percent by mass or less, with the remainder comprising Al and inevitable impurities.

9. The sheet of claim 7, wherein the filler material comprises a Si content of 3 percent by mass or more and 7 percent by mass or less.

10. The sheet of claim 7, wherein the filler material comprises a Si content of 3 percent by mass or more and 6.8 percent by mass or less.

11. The sheet of claim 1, wherein the core material comprises a Cu content of 1.5 percent by mass or less, a Si content of 1.5 percent by mass or less, a Mn content of 1.8 percent by mass or less, a Ti content of 0.35 percent by mass or less, and a Mg content of 0.5 percent by mass or less, with the remainder comprising Al and inevitable impurities.

12. The sheet of claim 1 wherein the sheet is suitable for use in a heat exchanger.

13. The sheet of claim 1, wherein the filler material comprises a Si content of 3 percent by mass or more and 7 percent by mass or less.

14. The sheet of claim 1, wherein the filler material comprises a Si content of 3 percent by mass or more and 6.8 percent by mass or less.

* * * * *